United States Patent
Hou et al.

(10) Patent No.: US 11,813,920 B2
(45) Date of Patent: Nov. 14, 2023

(54) PIPING SYSTEM FOR AIR CONDITIONER INSTALLED IN VEHICLE

(71) Applicant: THE YOKOHAMA RUBBER CO., LTD., Tokyo (JP)

(72) Inventors: Gang Hou, Hiratsuka (JP); Hiroaki Shibano, Hiratsuka (JP); Jiro Watanabe, Hiratsuka (JP); Susumu Hatanaka, Hiratsuka (JP); Naoshi Yamaguchi, Hiratsuka (JP); Mie Okura, Hiratsuka (JP); Ikuma Yusa, Hiratsuka (JP); Shusaku Tomoi, Hiratsuka (JP); Tomohide Saita, Hiratsuka (JP); Hiroyuki Wakamatsu, Hiratsuka (JP); Ryuhei Suzuki, Hiratsuka (JP); Yuki Mizutani, Hiratsuka (JP); Nobuaki Kuribayashi, Hiratsuka (JP); Hiroshi Shintani, Tokyo (JP); Kazuto Yamakawa, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 81 days.

(21) Appl. No.: 17/619,731

(22) PCT Filed: Mar. 24, 2020

(86) PCT No.: PCT/JP2020/012882
§ 371 (c)(1),
(2) Date: Dec. 16, 2021

(87) PCT Pub. No.: WO2021/019836
PCT Pub. Date: Feb. 4, 2021

(65) Prior Publication Data
US 2022/0355643 A1   Nov. 10, 2022

(30) Foreign Application Priority Data

Jul. 30, 2019  (JP) .................................. 2019-139689

(51) Int. Cl.
*B60H 1/00* (2006.01)
*F16L 11/08* (2006.01)

(52) U.S. Cl.
CPC .......... *B60H 1/00571* (2013.01); *F16L 11/08* (2013.01); *F16L 11/082* (2013.01); *F16L 11/086* (2013.01)

(58) Field of Classification Search
CPC ..... B60H 1/00571; F16L 11/08; F16L 11/082; F16L 11/086
(Continued)

(56) References Cited

U.S. PATENT DOCUMENTS 6,438,985 B1   8/2002  Hayashi
6,715,540 B2   4/2004  Kobayashi et al.
(Continued)

FOREIGN PATENT DOCUMENTS

JP   H08-312843 A   11/1996
JP   2001-082814 A   3/2001
(Continued)

OTHER PUBLICATIONS

PCT/ISA/210 from International Application PCT/JP2020/012882 with the English translation thereof.

*Primary Examiner* — Craig M Schneider
*Assistant Examiner* — David R Deal
(74) *Attorney, Agent, or Firm* — Carrier, Shende & Associates P.C.; Fulchand P. Shende; Joseph P. Carrier

(57) ABSTRACT

Provided is a piping system for an air conditioner installed in a vehicle that can achieve appropriate weight reduction while ensuring appropriate pressure resistance as the piping
(Continued)

system as a whole. A circulation path that connects component devices of an air conditioner (8) in an annular shape to circulate a refrigerant (C) is formed by each pipe body extending between the component devices. At least one of the pipe bodies includes: a resin hose (2) embedded with a non-metal reinforcing material (3*f*) or a resin pipe (5) embedded with a non-metal reinforcing material (6*f*), and the resin pipe bodies (2), (5) are employed in 50% or more of a total length of each of the pipe bodies constituting the circulation path.

12 Claims, 5 Drawing Sheets

(58) Field of Classification Search
USPC .......................................................... 138/137
See application file for complete search history.

(56) References Cited

U.S. PATENT DOCUMENTS

| | | | | |
|---|---|---|---|---|
| 9,346,954 | B2* | 5/2016 | Kim | C08K 5/56 |
| 10,584,810 | B2* | 3/2020 | Ishii | B32B 27/40 |
| 2010/0104787 | A1* | 4/2010 | Gong | C08L 23/16 |
| | | | | 428/35.9 |
| 2011/0186170 | A1* | 8/2011 | Oishi | B32B 27/34 |
| | | | | 138/140 |
| 2013/0216751 | A1 | 8/2013 | Mizutani et al. | |
| 2015/0000781 | A1* | 1/2015 | Oishi | B32B 27/28 |
| | | | | 138/137 |
| 2016/0053109 | A1* | 2/2016 | Okamatsu | C09J 163/00 |
| | | | | 525/117 |
| 2016/0096981 | A1* | 4/2016 | Miyamoto | C09J 171/08 |
| | | | | 524/424 |
| 2018/0201750 | A1* | 7/2018 | Sato | C08K 3/04 |

FOREIGN PATENT DOCUMENTS

| | | | |
|---|---|---|---|
| JP | 2001-289534 | A | 10/2001 |
| JP | 2002-200917 | A | 7/2002 |
| JP | 2002-285961 | A | 10/2002 |
| JP | 2003-025415 | A | 1/2003 |
| JP | 2004-197797 | A | 7/2004 |
| JP | 2009-023256 | A | 2/2009 |
| JP | 2013-155793 | A | 8/2013 |
| JP | 2013-228081 | A | 11/2013 |
| JP | 6542447 | B1 | 7/2019 |

* cited by examiner

PIPING SYSTEM FOR AIR CONDITIONER INSTALLED IN VEHICLE

TECHNICAL FIELD

The present invention relates to a piping system for an air conditioner installed in a vehicle and particularly relates to a piping system that can achieve appropriate weight reduction while ensuring appropriate pressure resistance as the piping system as a whole.

BACKGROUND ART

An air conditioner installed in a vehicle is required to adjust the temperature of an interior space to an appropriate temperature regardless of a change in temperature outside the vehicle to maintain a comfortable environment. The air conditioner includes a circulation path for circulating a refrigerant, and the air conditioner circulates the refrigerant discharged by the driving of a compressor back into the compressor via a condenser, a separation dryer (receiver dryer), an expansion valve, and an evaporator. The evaporator is configured to heat or cool the interior space by heat exchange.

The circulation path is required to have pressure resistance that can withstand internal pressure caused by the refrigerant flowing therethrough, and thus a metal pipe and a rubber hose are widely used. In recent years, there has been demand for reducing vehicle weight from the perspective of reducing environmental impact, improving energy efficiency, and the like. This also requires reducing the weight of the metal pipe and the rubber hose that constitute the circulation path, but the weight of the metal pipe is large per unit, which is disadvantageous in weight reduction. The rubber hose is embedded with a reinforcing material such as a metal cord to resist the internal pressure caused by the refrigerant, and thus there is no advantage in weight reduction.

On the other hand, various resin hoses have been proposed as a hose for an air conditioner in a vehicle (see, for example, Patent Document 1). Such resin hoses are advantageous in weight reduction compared to metal pipes and rubber hoses. An air conditioner includes various other component devices including a compressor, a condenser, and an evaporator. However, known proposals do not specify what kind of component devices of the air conditioner are connected by the resin hose. Depending on the length of the resin hose used in the piping system as a whole, sufficient weight reduction cannot be obtained. Thus, there is room for improvement in achieving weight reduction while ensuring appropriate pressure resistance as the piping system as a whole.

CITATION LIST

Patent Literature

Patent Document 1: JP 2013-155793 A

SUMMARY OF INVENTION

Technical Problem

An object of the present invention is to provide a piping system for an air conditioner installed in a vehicle that can achieve appropriate weight reduction while ensuring appropriate pressure resistance as the piping system as a whole.

Solution to Problem

In order to achieve the object described above, a piping system for an air conditioner installed in a vehicle according to an embodiment of the present invention includes pipe bodies constituting a circulation path connecting, in an annular shape, component devices of the air conditioner installed in the vehicle to circulate a refrigerant, each of the pipe bodies extending between the component devices that are connected, where resin pipe bodies embedded with a non-metal reinforcing material are employed in 50% or more of the total length of each of the pipe bodies.

Advantageous Effects of Invention

According to an embodiment of the present invention, appropriate pressure resistance that can withstand internal pressure caused by the refrigerant can be ensured as the piping system as a whole by using, in the circulation path through which the refrigerant flows, the resin pipe body embedded with the non-metal reinforcing material. Furthermore, by using the resin pipe body in 50% or more of the total length of each of the pipe bodies constituting the circulation path, appropriate weight reduction can be achieved as the piping system as a whole.

DESCRIPTION OF EMBODIMENTS

A piping system for an air conditioner installed in a vehicle according to embodiments of the present invention will be described below with reference to the drawings.

Figure 1:
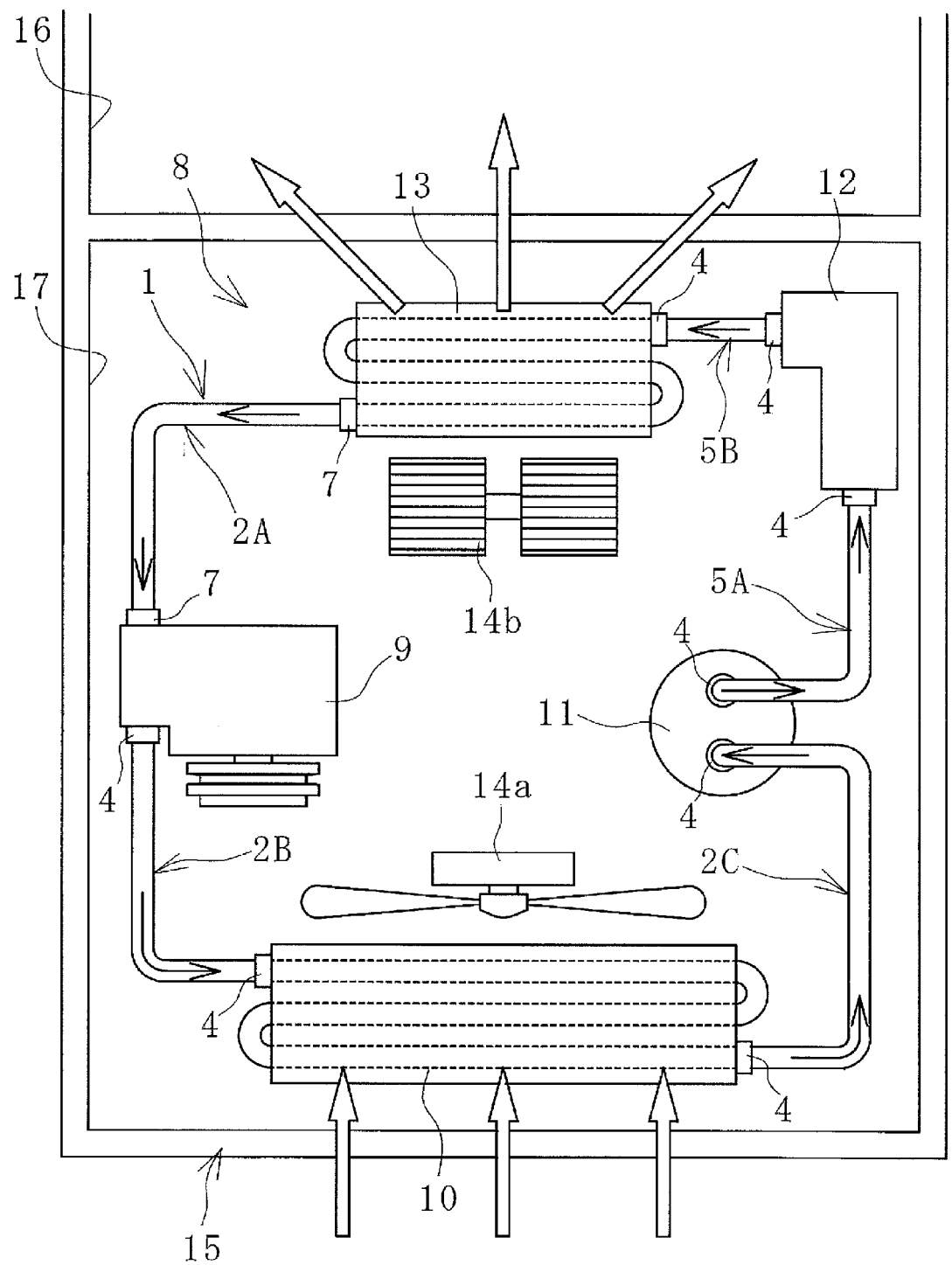
FIG. 1 is an explanatory diagram schematically illustrating an air conditioner provided with a piping system according to an embodiment of the present invention in a plan view.

As illustrated in FIG. 1, an air conditioner 8 installed in a vehicle 15 (hereinafter referred to as the AC 8) is disposed in an exterior space 17 such as an engine compartment to appropriately adjust the temperature of an interior space 16 where the driver and the like are. The AC 8 includes a plurality of component devices and is provided with the component devices and a circulation path for circulating a refrigerant C. Examples of the refrigerant C include HFC-134a and HFO-1234y.

Examples of the component devices of the AC 8 include at least a compressor 9, a condenser 10, a separation dryer 11, an expansion valve 12, and an evaporator 13. The AC 8 includes other component devices as necessary.

In the embodiment of the present invention, the condenser 10 is disposed at a front end portion of the vehicle 15, and a fan 14a is disposed adjacent to and behind the condenser 10. The condenser 10 includes a flow path through which the refrigerant C flows, and the flow path bends and extends over a long length. The evaporator 13 is disposed adjacent to and in front of the interior space 16. The evaporator 13 also includes a flow path through which the refrigerant C flows, and the flow path bends and extends over a long length. A fan 14b is disposed adjacent to and in front of the evaporator 13.

A piping system 1 for an air conditioner according to an embodiment of the present invention (hereinafter referred to as the piping system 1) includes a plurality of resin pipe bodies 2, 5 that constitute the circulation path of the refrigerant C. In the embodiment, the piping system 1 includes resin hoses 2 (2A, 2B, 2C) each embedded with a non-metal reinforcing material 3f and resin pipes 5 (5A, 5B) each embedded with a non-metal reinforcing material 6f described below.

The resin hose 2B between the compressor 9 and the condenser 10; the resin hose 2C between the condenser 10 and the separation dryer 11; the resin pipe 5A between the separation dryer 11 and the expansion valve 12; and the resin pipe 5B between the expansion valve 12 and the evaporator 13 are each connected via a fixing member 4. The resin hose 2A between the evaporator 13 and the compressor 9 is connected via a fixing member 7. The resin hose 2 or the resin pipe 5 extends between each of the component devices of the AC 8 to form the circulation path that connects the component devices in an annular shape to circulate the refrigerant C.

Figure 2:
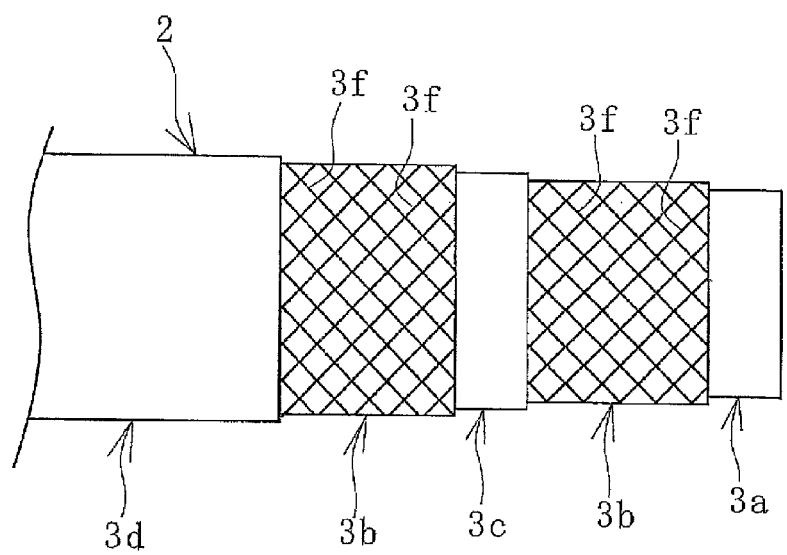
FIG. 2 is a partially cutout explanatory diagram illustrating a resin hose in FIG. 1.
Figure 3:
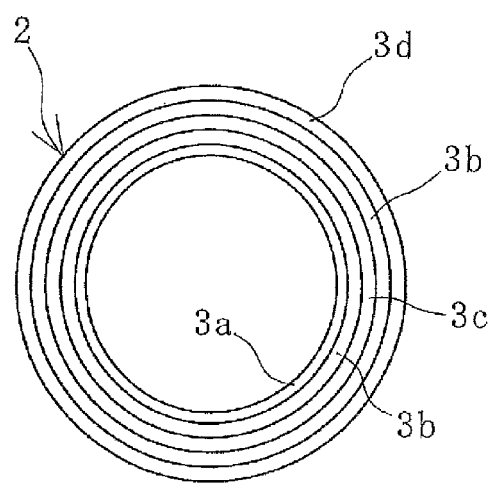
FIG. 3 is a traverse cross-sectional view of the resin hose in FIG. 2.

As illustrated in FIGS. 2 and 3, the resin hose 2 is a pliable resin pipe body embedded with the non-metal reinforcing material 3f. Specifically, the resin hose 2 includes an inner surface layer 3a, a reinforcing layer 3b, and an outer surface layer 3d, which are layered coaxially and sequentially from an inner circumferential side. In the embodiment of the present invention, an intermediate layer 3c is interposed between reinforcing layers 3b that are layered adjacent to each other. The hose 2 is provided with other members (layers) as necessary. Note that the resin hose 2 according to an embodiment of the present invention is not limited to a configuration in which all of the constituent members are made of resin, and includes a configuration in which some of the constituent members are made of rubber. In the resin hose 2, adjacent layers are bonded together and integrated.

The inner surface layer 3a is positioned on an innermost circumferential side to form the flow path for the refrigerant C. The inner surface layer 3a is in direct contact with the refrigerant C, and thus an appropriate resin is employed in consideration of durability against the refrigerant C and the like, and a blended material of a polyamide (PA) and a rubber-based material, for example, is used. In a configuration in which HFO-1234y is used as the refrigerant C, impermeable properties against the refrigerant C can be improved by using a blended material of a nylon resin and a bromine-based isobutylene-paramethylstyrene copolymer for the inner surface layer 3a. The layer thickness of the inner surface layer 3a is, for example, 2.5 mm or less.

The reinforcing layer 3b is formed of the reinforcing material 3f such as a resin fiber or a natural fiber. In the embodiment of the present invention, the reinforcing layer 3b is a braid layer braided with the reinforcing material 3f, but, in other embodiments of the present invention, the reinforcing layer 3b may be a spiral layer in which the reinforcing material 3f is spirally wound. The material of the reinforcing material 3f and the number of layers of the reinforcing layer 3b are determined in consideration of pressure resistance required of the resin hose 2 and the like. The layer thickness of the reinforcing layer 3b is, for example, 0.5 mm or less.

An appropriate resin is employed for the outer surface layer 3d in consideration of scratch resistance, weather resistance, and the like. For example, a thermoplastic polyester elastomer (TEEE) is used for the outer surface layer 3d. The layer thickness of the outer surface layer 3d is, for example, 1.5 mm or less.

Figure 4:
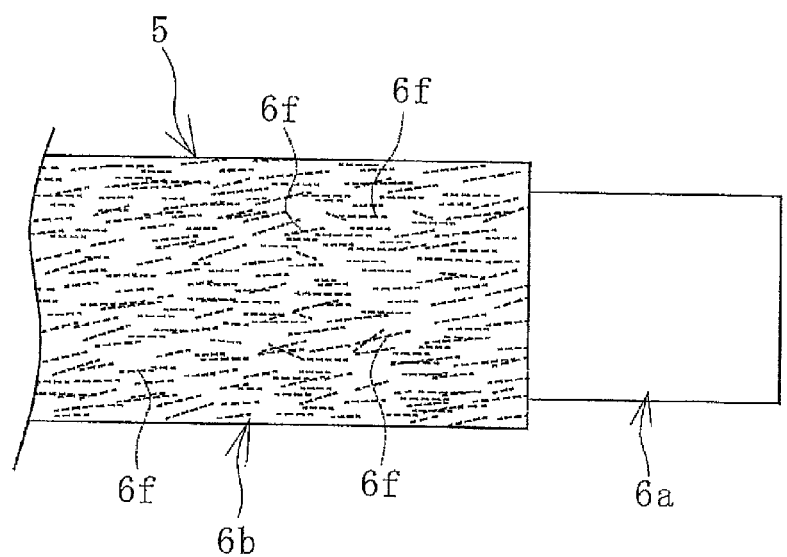
FIG. 4 is a partially cutout explanatory diagram illustrating a resin pipe in FIG. 1.
Figure 5:
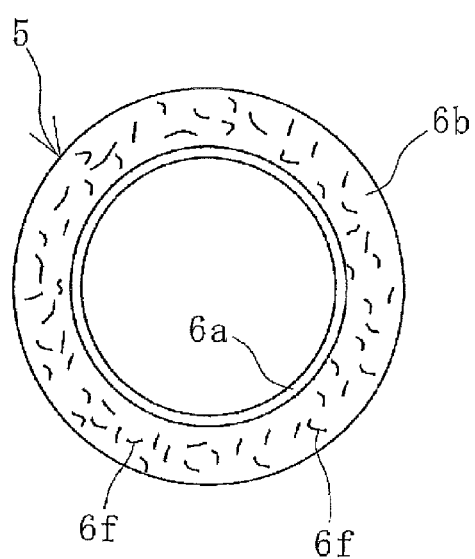
FIG. 5 is a traverse cross-sectional view of the resin pipe in FIG. 4.

As illustrated in FIGS. 4 and 5, the resin pipe 5 is a non-pliable resin pipe body embedded with the non-metal reinforcing material 6f. Specifically, an inner surface layer 6a and an outer surface layer 6b are layered sequentially and coaxially to form the resin pipe 5. The resin pipe 5 is provided with other members (layers) as necessary. The resin pipe 5 is manufactured by injection molding and the like, and includes the inner surface layer 6a and the outer surface layer 6b that are bonded together and integrated.

The inner surface layer 6a forms the flow path for the refrigerant C. The inner surface layer 6a is in direct contact with the refrigerant C, thus, in consideration of durability for the refrigerant C and the like, an appropriate resin is employed, and a polyamide, for example, is used. In a configuration in which HFO-1234y is used as the refrigerant C, impermeable properties against the refrigerant C can be improved by using a blended material of a nylon resin and a bromine-based isobutylene-paramethylstyrene copolymer for the inner surface layer 6a. The layer thickness of the inner surface layer 6a is, for example, 0.5 mm or less.

An appropriate resin is employed for the outer surface layer 6b in consideration of scratch resistance, weather resistance, and the like. For example, a polyamide is employed for the outer surface layer 6b. The layer thickness of the outer surface layer 6b is, for example, 2.0 mm or less. The outer surface layer 6b and the inner surface layer 6a can be more strongly integrated by using a resin of an identical type.

The reinforcing material 6f is embedded in the outer surface layer 6b without being embedded in the inner surface layer 6a. The material and the blended amount of the reinforcing material 6f are determined in consideration of pressure resistance required in the resin pipe 5 and the like. Examples of the reinforcing material 6f include a glass fiber and a carbon fiber.

Next, an operational state of the AC 8 will be described with reference to an example of a case in which the interior space 16 is cooled.

The refrigerant C flows sequentially into each of the component devices of the AC 8 and circulates throughout the piping system 1, with the compressor 9 being a drive source. The refrigerant C in a low-temperature, low-pressure gaseous state flows into the compressor 9 through the resin hose 2A. The refrigerant C that flows thereinto is pressurized by driving of the compressor 9 into a high-temperature, high-pressure gaseous state, and discharged from the compressor 9 into the resin hose 2B.

Next, the refrigerant C flows via the resin hose 2B into the condenser 10. The refrigerant C is cooled by passing through a flow path of the condenser 10 that receives wind by the fan 14a and air outside of the vehicle 15. The refrigerant C that has been cooled into a low-temperature, high-pressure liquid state is discharged from the condenser 10 into the resin hose 2C.

Next, the refrigerant C flows via the resin hose 2C into the separation dryer 11. In the separation dryer 11, a portion of the moisture of the refrigerant C is absorbed by a drying agent. Accordingly, the refrigerant C in a low-temperature, high-pressure liquid state with a reduced humidity is discharged into the resin pipe 5A.

Next, the refrigerant C flows via the resin pipe 5A into the expansion valve 12. In the expansion valve 12, the refrigerant C is expanded. The refrigerant C that has been expanded into a low-temperature, low-pressure mist state is discharged from the expansion valve 12 into the resin pipe 5B.

Next, the refrigerant C flows via the resin pipe 5B into the evaporator 13. The refrigerant C passes through a flow path of the evaporator 13 and is heat exchanged by the evaporator 13 that receives wind by the fan 14b. Accordingly, cool air is introduced into the interior space 16 to appropriately adjust the temperature in the interior space 16.

The refrigerant C that has been heat exchanged turns into a low-temperature, low-pressure gaseous state, is discharged from the evaporator 13 into the resin hose 2A, and flows back into the compressor 9. Thus, the refrigerant C circulates between the component devices of the AC 8 throughout the piping system 1.

The piping system 1 is created with an eye to the piping system as a whole as well as to each of the pipe bodies connecting the component devices of the AC 8. Thus, in the piping system 1, a resin pipe body (at least one of the resin hose 2 and the resin pipe 5) is employed in 50% or more of the total length of the pipe bodies constituting the circulation path. Accordingly, the pipe system 1 may include not only the resin pipe bodies 2, 5 but also a metal pipe, a rubber hose, or the like that can withstand the internal pressure caused by the refrigerant C that circulates therethrough. However, the piping system 1 includes the resin pipe bodies 2, 5 in 50% or more of the length of the piping system as a whole. The resin pipe bodies 2, 5 are preferably employed in 90% or more of the total length of the pipe bodies constituting the circulation path, and more preferably in 100% thereof.

By using the resin pipe bodies 2, 5, which are embedded with the non-metal reinforcing materials 3f and 6f, respectively, appropriate pressure resistance that can withstand the internal pressure caused by the refrigerant C can be ensured for the piping system as a whole. The maximum pressure for use of each of the resin pipe bodies 2, 5 is, for example, 3 MPa or more and 10 MPa or less. Furthermore, by employing the resin pipe bodies 2, 5 in 50% or more of the total length of each of the pipe bodies constituting the circulation path, the weight of the piping system as a whole can be appropriately reduced.

As described above, the same refrigerant C flows throughout the piping system 1, but the properties (temperature, pressure, and the like) of the refrigerant C flowing through each of the pipe bodies vary depending on the component device connected. Accordingly, there is a restriction to make the specifications of each of the pipe bodies appropriate for the properties of the refrigerant C flowing therethrough. In addition, the disposition of the component devices of the AC 8 in the exterior space 17 is predetermined, which places a restriction on handling (the shape and length) of each of the pipe bodies.

Under the two restrictions, the piping system 1 includes the resin pipe bodies 2, 5 described above in 50% or more, preferably 90% or more, and more preferably 100% of the total length of each of the pipe bodies constituting the circulation path. That is, under the two restrictions, the ratio of the length of the resin pipe bodies 2, 5 described above in the total length of each of the pipe bodies constituting the circulation path is maximized. Thus, under the two restrictions, weight reduction of the piping system 1 is maximized. Although the piping system 1 can include only one of the resin hose 2 and the resin pipe 5, a mixture of both can be used to more easily adjust to the varying properties of the refrigerant C in the circulation process.

The evaporator 13 and the compressor 9, which can be connected by the resin pipe 5, can be preferably connected by the resin hose 2 as in the embodiment of the present invention. The refrigerant C in the low-temperature, low-pressure gaseous state flows between the evaporator 13 and the compressor 9, and the resin hose 2 can be used to improve thermal efficiency due to lower thermal conductivity compared to aluminum piping, and also dew condensation is suppressed compared to aluminum piping, and this is advantageous in protecting peripheral components. In addition, the resin hose 2 can be preferably connected to prevent a vibration of the compressor 9 from being directly transmitted to the interior space 16 of the vehicle 15, without being damped. The refrigerant C in the high-temperature, high-pressure gaseous state flows between the compressor 9 and the condenser 10, and thus the compressor 9 and the condenser 10 can be connected by the resin hose 2, as in the embodiment of the present invention, to advantageously suppress the vibration of the compressor 9.

The resin hose 2 is superior in flexibility and anti-damping properties to the resin pipe 5, and can be easily disposed and bent finely even in a narrow space. Thus, the resin hose 2 is preferably used for connecting component devices in such a location. The resin pipe 5 is superior in low-temperature resistance to the resin hose 2. Accordingly, a location where the resin hose 2 is used in the piping system 1 and a location where the resin pipe 5 is used are preferably determined in consideration of anti-damping properties, low-temperature resistance, high-temperature resistance, flexibility, and the like.

Due to low thermal conductivity of resin, the piping system 1, in which a known metal pipe and a known rubber hose has been replaced with the resin pipe bodies 2, 5, is advantageous in suppressing heat discharged from across the piping system as a whole. This can more easily prevent overheating of the internal temperature of the exterior space 17. In addition, ingress and egress of heat between the inside and the outside of the resin pipe bodies 2, 5 is suppressed, and thus the heat efficiency of the AC 8 is also improved.

REFERENCE SIGNS LIST

1 Piping system
2 (2A, 2B, 2C) Resin hose (resin pipe body)
3a Inner surface layer
3b Reinforcing layer
3c Intermediate layer
3d Outer surface layer
3f Reinforcing material
4 Fixing member
5 (5A, 5B) Resin pipe (resin pipe body)
6a Inner surface layer
6b Outer surface layer
6f Reinforcing material
7 Fixing member
8 Air conditioner
9 Compressor
10 Condenser
11 Separation dryer
12 Expansion valve
13 Evaporator 14a, 14b Fan
15 Vehicle
16 Interior space
17 Exterior space
C Refrigerant

The invention claimed is:

1. A piping system for an air conditioner installed in a vehicle, the piping system comprising:
a plurality of pipes constituting a circulation path connecting three or more component devices, being disposed separate from each other, of the air conditioner installed in the vehicle to circulate a refrigerant, each of the pipes extending between the component devices that are connected,
resin pipe bodies embedded with a non-metal reinforcing material being employed in 50% or more of a total length of each of the pipes,
wherein the resin pipe bodies comprise a resin inner surface layer and a resin outer surface layer and both a pliable resin hose and a non-pliable resin pipe are used as the resin pipe bodies, and
in the pliable resin hose, the reinforcing material is interposed between the inner surface layer and the outer surface layer, and in the non-pliable resin pipe, the reinforcing material is embedded in the outer surface layer without being embedded in the inner surface layer.

2. The piping system for an air conditioner installed in a vehicle according to claim 1, wherein the resin pipe bodies are employed in 100% of the total length of each of the plurality of pipes.

3. The piping system for an air conditioner installed in a vehicle according to claim 2, wherein a maximum pressure for use of each of the plurality of pipes is set to be 10 MPa or less.

4. The piping system for an air conditioner installed in a vehicle according to claim 2, wherein
the component devices comprise an evaporatior and a compressor; and
the non-pliable resin pipe is used, as the resin pipe bodies, for connecting the evaporator and the compressor.

5. The piping system for an air conditioner installed in a vehicle according to claim 2, wherein
the component devices comprise a compressor and a condensor; and
the pliable resin hose is used, as the resin pipe bodies, for connecting the compressor and the condenser being some of the component devices.

6. The piping system for an air conditioner installed in a vehicle according to claim 1, wherein a maximum pressure for use of each of the plurality of pipes is set to be 10 MPa or less.

7. The piping system for an air conditioner installed in a vehicle according to claim 6, wherein
the component devices comprise an evaporatior and a compressor; and
the non-pliable resin pipe is used, as the resin pipe bodies, for connecting the evaporator and the compressor.

8. The piping system for an air conditioner installed in a vehicle according to claim 6, wherein
the component devices comprise a compressor and a condensor; and
the pliable resin hose is used, as the resin pipe bodies, for connecting the compressor and the condenser.

9. The piping system for an air conditioner installed in a vehicle according to claim 1, wherein
the component devices comprise an evaporatior and a compressor; and
the non-pliable resin pipe is used, as the resin pipe bodies, for connecting the evaporator and the compressor.

10. The piping system for an air conditioner installed in a vehicle according to claim 9, wherein
the component devices comprise a compressor and a condensor; and
the pliable resin hose is used, as the resin pipe bodies, for connecting the compressor and the condenser.

11. The piping system for an air conditioner installed in a vehicle according to claim 1, wherein
the component devices comprise a compressor and a condensor; and
the pliable resin hose is used, as the resin pipe bodies, for connecting the compressor and the condenser.

12. A piping system for an air conditioner installed in a vehicle, the piping system comprising:
a plurality of pipes constituting a circulation path connecting component devices of the air conditioner installed in the vehicle to circulate a refrigerant, each of the pipes extending between the component devices that are connected; and
resin pipe bodies embedded with a non-metal reinforcing material being employed in 50% or more of a total length of each of the pipes,
wherein the resin pipe bodies comprise a resin inner surface layer and a resin outer surface layer and both a pliable resin hose and a non-pliable resin pipe are used as the resin pipe bodies,
in the pliable resin hose, the reinforcing material is interposed between the inner surface layer and the outer surface layer, and in the non-pliable resin pipe, the reinforcing material is embedded in the outer surface layer without being embedded in the inner surface layer, and
wherein at least one of the resin pipe bodies is superior in flexibility and anti-damping properties compared to the other resin pipe bodies.

* * * * *